US010346752B2

(12) United States Patent
Ahn et al.

(10) Patent No.: US 10,346,752 B2
(45) Date of Patent: Jul. 9, 2019

(54) CORRECTING EXISTING PREDICTIVE MODEL OUTPUTS WITH SOCIAL MEDIA FEATURES OVER MULTIPLE TIME SCALES

(71) Applicant: International Business Machines Corporation, Armonk, NY (US)

(72) Inventors: Hyung-il Ahn, San Jose, CA (US); William Scott Spangler, San Martin, CA (US)

(73) Assignee: International Business Machines Corporation, Armonk, NY (US)

( * ) Notice: Subject to any disclaimer, the term of this patent is extended or adjusted under 35 U.S.C. 154(b) by 777 days.

(21) Appl. No.: 14/255,512

(22) Filed: Apr. 17, 2014

(65) Prior Publication Data
US 2015/0302315 A1 Oct. 22, 2015

(51) Int. Cl.
*G06N 5/04* (2006.01)
*G06F 16/00* (2019.01)
(Continued)

(52) U.S. Cl.
CPC ............ *G06N 5/04* (2013.01); *G06F 16/00* (2019.01); *G06Q 10/00* (2013.01); *G06Q 50/01* (2013.01)

(58) Field of Classification Search
CPC .......... G06N 5/04; G06N 99/005; G06N 5/02; G06N 5/003; G06Q 30/02
(Continued)

(56) References Cited

U.S. PATENT DOCUMENTS 5,727,128 A * 3/1998 Morrison ................. G06N 3/08
706/14
6,760,716 B1 * 7/2004 Ganesamoorthi .... G05B 13/027
706/14
(Continued)

FOREIGN PATENT DOCUMENTS

CN 103037391 4/2013

OTHER PUBLICATIONS

IP.com: System and Method for Dynamic Survey Generation Based on Social Media Analysis, Anonymously; Jul. 27, 2012.
(Continued)

*Primary Examiner* — Scott A. Waldron
*Assistant Examiner* — Viker A Lamardo
(74) *Attorney, Agent, or Firm* — Ryan, Mason & Lewis, LLP

(57) ABSTRACT

Methods, systems, and computer program products for correcting existing predictive model outputs with social media features over multiple time scales are provided herein. A method includes examining multiple items of user content derived from one or more social media sources during a given time period to identify one or more items of user content pertaining to a target entity; analyzing the items of user content pertaining to the target entity to determine one or more predictive features in the items of user content related to a target variable associated with the target entity; computing a correlation measure between each of the predictive features and the target variable; and modifying an output of an existing predictive model associated with the target variable via incorporation of the predictive feature with the highest correlation measure into the output of the existing predictive model to generate an updated predictive output.

14 Claims, 3 Drawing Sheets

(51) Int. Cl.
*G06Q 10/00* (2012.01)
*G06Q 50/00* (2012.01)

(58) Field of Classification Search
USPC .......................................................... 706/46
See application file for complete search history.

(56) References Cited

U.S. PATENT DOCUMENTS

| | | | | |
|---|---|---|---|---|
| 2012/0083933 A1* | 4/2012 | Subbu | ...................... | G06N 3/02 |
| | | | | 700/291 |
| 2012/0246104 A1* | 9/2012 | Di Sciullo | ............. | G06Q 50/01 |
| | | | | 706/46 |
| 2013/0290232 A1* | 10/2013 | Tsytsarau | ............. | G06N 99/005 |
| | | | | 706/46 |
| 2013/0297694 A1* | 11/2013 | Ghosh | .................... | H04L 67/02 |
| | | | | 709/204 |
| 2015/0006286 A1* | 1/2015 | Liu | ........................ | G06Q 50/01 |
| | | | | 705/14.53 |

OTHER PUBLICATIONS

Statchuk et al. Enhancing Enterprise Systems with Big Data, 2013.
Asur et al. Predicting the Future with Social Media, Web Intelligence and Intelligent Agent Technology, IEEE/WIC/ACM International Conference 2010.
Mishne et al. Predicting Movie Sales from Blogger Sentiment, AAAI 2006 Spring Symposium on Computational Approaches to Analysis Weblogs.
Spangler et al. COBRA—Mining Web for Corporate Brand and Reputation Analysis, Web Intelligence and Agent Systems 7(3), 243-254, IOS Press, 2009.
Spangler et al. Machines in the Conversation: Detecting Themes and Trends in Informal Communication Streams, IBM Syst. J., vol. 45, No. 4, pp. 785-799, 2006.

* cited by examiner

CORRECTING EXISTING PREDICTIVE MODEL OUTPUTS WITH SOCIAL MEDIA FEATURES OVER MULTIPLE TIME SCALES

FIELD OF THE INVENTION

Embodiments of the invention generally relate to information technology, and, more particularly, to predictive models.

BACKGROUND

Social media outlets including, for example, news sites, blogs, Twitter® and Facebook®, can serve as proxies of customers' opinions for companies and/or enterprises, wherein such opinions commonly include past customer experiences and current expectations about products and/or services. For instance, subjective personal opinions as well as more objective professional reviews about products and/or services that spread or proliferate via social media can often affect buying behavior and future sales.

SUMMARY

An advantage of the current invention is that it allows companies and enterprises to leverage the analysis of social media content to adjust and/or correct existing predictive model outputs pertaining to given products and/or services in order to improve prediction accuracy. Further, because predictive models can often be complex and difficult to change, any such adjustments and/or corrections may be made without utilizing the specifics of the given existing model. Preferred embodiments of the invention leverage social media data to correct an existing predictive model output and sequentially predict a target variable corresponding thereto.

In one aspect of the present invention, techniques for correcting existing predictive model outputs with social media features over multiple time scales are provided. An exemplary computer-implemented method can include steps of examining multiple items of user content derived from one or more social media sources during a given time period to identify one or more items of user content pertaining to a target entity; analyzing the one or more items of user content pertaining to the target entity to determine one or more predictive features in the one or more items of user content related to a target variable associated with the target entity; computing a correlation measure between each of the one or more predictive features and the target variable; and modifying an output of an existing predictive model associated with the target variable via incorporation of the predictive feature with the highest correlation measure into the output of the existing predictive model to generate an updated predictive output.

In another aspect of the invention, an exemplary computer-implemented method can include performing meta analysis to correct output from an existing predictive model, by combining the output from the existing predictive model with an analysis of selected features in social media data of potential customers, wherein the selected features are examined over different time scales.

In yet another aspect of the invention, an exemplary computer-implemented method can include steps of identifying one or more items of user content pertaining to a target entity, wherein said one or more items of user content comprise user content derived from one or more pre-selected social media sources during a given time period; and analyzing the one or more items of user content pertaining to the target entity to determine (i) one or more keyword trends related to a target variable associated with the target entity, (ii) one or more sentiment fluctuations related to the target variable associated with the target entity, and (iii) one or more keyword fluctuations related to the target variable associated with the target entity. The method also includes steps of computing a correlation measure between the one or more keyword trends and a trend of the target variable; computing a correlation measure between the one or more sentiment fluctuations and a fluctuation of the target variable; computing a correlation measure between the one or more keyword fluctuations and a fluctuation of the target variable; and modifying an output of an existing predictive model associated with the target variable via incorporation, based on said correlation measures, of at least one of (i) the one or more keyword trends, (ii) the one or more sentiment fluctuations and (iii) the one or more keyword fluctuations into the output of the existing predictive model to generate an updated predictive output.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes correcting existing predictive model outputs with social media features over multiple time scales. At least one embodiment of the invention includes performing meta analysis to correct a company's existing predictive model output for a target variable related to a given product or service (also referred to herein as a target brand) and boost the prediction accuracy of the predictive model by combining the existing predictive model output with a social media-based analysis of selected features derived from social media sources of potential customers. Additionally, at least one embodiment of the invention includes performing the meta analysis without utilizing specifics of the existing predictive model; that is, viewing the existing predictive model as a "black box," as further described herein.

Meta analysis can provide, for example, a sequential prediction of a target variable with an increased accuracy by combining outcomes or outputs from the existing predictive model and relevant time-scale features from a social media-based analysis. The social media-based analysis can include, for instance, examining different time scales of selected features (sentiments, frequencies of topic keywords in social media content related to the target brand and/or competitor brands, etc.) and selecting the relevant time-scale features to predict the target variable.

Figure 1:
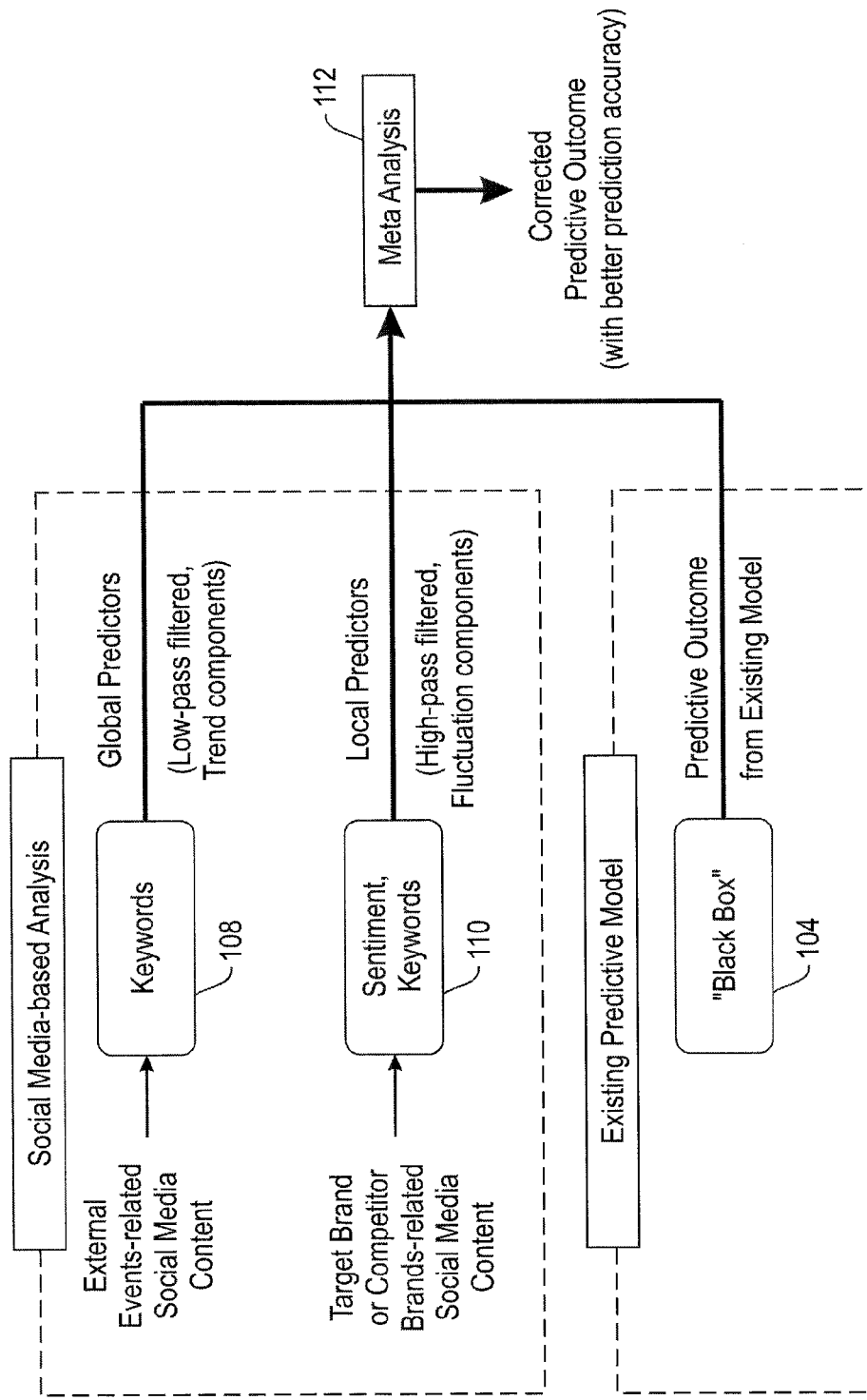
FIG. 1 is a diagram illustrating aspects of an example embodiment of the invention.

FIG. 1 is a diagram illustrating aspects of an example embodiment of the invention. By way of illustration, FIG. 1 depicts components implemented to correct predicted outcomes of an existing predictive model by combining social media-based predictors of low-pass filtered (keyword trend) and high-pass filtered (sentiment and keyword fluctuation) time series components. Specifically, as illustrated, FIG. 1 depicts an existing predictive model, which includes a black box component 104. The black box component 104 outputs one or more predictive outcomes from the existing predictive model to a meta analysis component 112, as additionally detailed herein.

FIG. 1 also depicts a social media-based analysis feature, which includes the combination of a keyword trend component 108 and a sentiment and keyword fluctuation component 110, both of which provide output to the meta analysis component 112. The social media-based analysis feature, as detailed herein, examines different time scales of one or more selected features (such as described in connection with components 108 and 110).

By way of example, in at least one embodiment of the invention, the fluctuation component 110, in connection with a sentiment time series (that is, the sentiment change, the high-pass filtered sentiment, etc.), tends to show a high correlation with the fluctuation of a predicted target history time series. That is, the fluctuation component 110 of the sentiment time series can serve as a local predictor when no significant external event (for example, an economic recession) is involved.

Additionally, for some topical keywords, the fluctuation component 110 associated with a keyword frequency time series (that is, the keyword frequency change, the high-pass filtered keyword frequency, etc.) tends to show a high correlation with the fluctuation component of a target variable. That is, the fluctuation component 110 of the keyword frequency time series of given topical keywords also serves as a local predictor. Accordingly, note that component 110 of FIG. 1 includes a fluctuation component of sentiment as well as a fluctuation component from some topical keyword frequencies.

Also, for other topical keywords, the keyword trend component 108, in connection with keyword frequency (that is, the low-pass filtered keyword frequency) tends to show a high correlation with a trend component of a predicted target history time series. Accordingly, the keyword trend component 108 of these other topical keywords can serve as a global predictor when a significant external event (for example, an economic recession) is involved.

As such, to discover significant predictors for forecasting a prediction target variable related to a target brand, the social media-based analysis feature analyzes the trend and fluctuation components of social media contents that make reference to the target brand and/or competitor brands. In other words, the social media-based analysis feature examines, via the fluctuation component 110, whether the sentiment or the frequency of some keywords helps local fluctuation prediction, and also examines, via the keyword trend component 108, whether the frequency of some other keywords improves an ability to predict a global pattern due to one or more external events.

To calculate a sentiment score of each snippet generated and/or derived from a given dataset of social media data, at least one embodiment of the invention includes using a semantic dictionary-based approach, which further includes the use of a sentiment lexicon that contains a given number of positive and negative words. Each sentiment word is assigned a degree (amount) score of positive or negative sentiment that the given word conveys. Based on the sentiment lexicon, the snippet sentiment score is computed as $10 \times (P-N)/\sqrt{L}$, wherein P and N, respectively, represent the sum of positive and negative score of all words in the snippet, and L denotes the number of all words in the snippet. Such an embodiment can also include, for example, partitioning all snippets into five equal-sized groups sorted by the sentiment score, and assigning a sentiment label (positive, neutral, or negative) to each quintile. In this example embodiment, the positive-sentiment label is assigned to the top quintile (20% of all snippets) and the negative-sentiment label to the bottom quintile (20% of all snippets). The neutral-sentiment label is assigned to the three middle quintiles (60% of all snippets).

In connection with topical keyword analysis, a given number of words that occur most frequently in the collected social media data are selected. At least one embodiment of the invention includes using a standard "stop word" list to eliminate words such as "and," "but," and "the." An example embodiment also includes counting the frequency of two-word phrases that occur using given words. The overall list of identified words and/or phrases can be pruned, for example, to a given number of most frequent terms (words and phrases). At least one embodiment of the invention also includes stemming to create a synonym table. Additionally, at least one embodiment of the invention includes ranking all discovered terms based on a normalized measure of cohesion. Note that terms that score relatively highly with this measure tend to be those terms with a significant number of postings having many common words.

The overall sentiment $s_t$ about a target brand is computed as $s_t=(C_{pos,t}-C_{neg,t})/(C_{pos,t}+C_{neg,t})$, wherein $C_{pos,t}$ and $C_{neg,t}$ are, respectively, the total count of positive and negative postings in time period t (for example, one month). In addition, at least one embodiment of the invention includes decomposing the overall sentiment time series $s_t$ into the sentiment trend component (low-pass filtered time series) $\tilde{s}_t$ and the sentiment fluctuation component (high-pass filtered time series) $\hat{s}_t$. Also, by way merely of example, the sentiment trend can be estimated by smoothing using a moving average of the order of three. That is, the sentiment trend on month t is computed as the average of overall sentiment for the most recent three months: $\tilde{s}_t=(s_t+s_{t-1}+s_{t-2})/3$. Also, the sentiment fluctuation $\hat{s}_t$ is defined as the de-trended time series, that is, the overall sentiment minus the trend component: $\hat{s}_t=s_t-\tilde{s}_t$.

Additionally, as detailed herein, the meta analysis component 112, as depicted in FIG. 1, combines outputs from the correlated keyword trend component 108 and the fluctuation component 110 (from the social media-based analysis feature) with one or more forecasted outcomes of an existing predictive model of the target brand to create a corrected and/or updated predictive model output.

As described herein, an aspect of the invention includes data collection. In at least one embodiment of the invention, data collection includes searching postings pertaining to a target brand and/or one or more competitor brands from pre-selected social media sites (news sites, blogs, Twitter® and Facebook®, etc.) over a given time period. Also, predictive outcomes derived from the company's existing predictive model can be prepared for the given time period. Further, in at least one embodiment of the invention, the collected data can be divided into datasets such as, for example, a training dataset and a validation dataset.

Also, as detailed herein, at least one embodiment of the invention includes social media-based analysis that can include computing and selecting features over different time scales. In such analysis, relevant topical keywords can be selected using a text clustering technique. An example embodiment implements a text clustering technique against the training dataset only. By way of illustration, in an example embodiment of the invention that includes using automobile target brand-related social media postings, topical keywords obtained using a text clustering technique can include the following examples: "accessory," "brakes," "cobalt," "cold," "crash," "economical," "feature," "fuel," "handling," "headlight," "hood," "interior," "lease," "leather," "luxury," "mileage," "mpg," "navigation," "noise," "performance," "plastic," "power," "review," "safety," "seat," "small," "solid," "space," "sporty," "styling," and "torque."

The total number of postings containing one of the given topical keywords are counted on a per time period (for example, a month) basis. Given a target or competitor brand b, a keyword k, and a time period t, this count can be denoted, for example, as KeyFreq(b, k, t). Also, at least one embodiment of the invention includes defining KeyFreqChange(b, k, t)=KeyFreq(b, k, t)−KeyFreq(b, k, t−1).

Another aspect of the invention includes computing one or more predictor variables derived from each keyword k. By way of illustration, the following list includes examples of predictor variables derived from keyword k: the keyword frequency offset KeyFreq(b, k, t−1), the keyword frequency change offset KeyFreqChange(b, k, t−1), the trend component of the keyword frequency offset (for example, Trend_KeyFreq(b, k, t−1)=LowPassFilter[KeyFreq(b, k, t−1)]), and the fluctuation component of the keyword frequency offset (for example, Fluctuation_KeyFreq(b, k, t−1) =HighPassFilter[KeyFreq(b, k, t−1)]).

Additionally, at least one embodiment of the invention includes counting the total number of positive, neutral, and/or negative sentiment social media postings per a given time period (for example, a month). Given a target or competitor brand b and a time period t, the total number of positive, neutral, and/or negative sentiment postings can be denoted as SentiPos(b, t), SentiNeu(b, t), SentiNeg(b, t). Additionally, such an embodiment can include defining and computing a sentiment measure based on these variables. An example embodiment of the invention includes defining the sentiment measure as: Senti(b, t)={SentiPos(b, t)−SentiNeg(b, t)}/({SentiPos(b, t)+SentiNeu(b, t)+SentiNeg(b, t)}. Also, such an embodiment can include defining a sentiment change measure as: SentiChange(b, t)=Senti(b, t)−Senti(b, t−1). If the sentiment analysis provides a sentiment score for each posting, the sentiment measure can be defined as the average sentiment score computed from all postings over each time period.

At least one embodiment of the invention additionally includes computing one or more predictor variables derived from the sentiment measure, the sentiment change offset SentiChange(b, t−1), and the fluctuation component of the sentiment offset, such as, for example, Fluctuation_Senti(b, t−1)=HighPassFilter[Senti(b, t−1)].

Also, an additional aspect of the invention includes denoting the predicted target history for a time period t as Y(t). Further, at least one embodiment of the invention includes decomposing a predicted target history time series into trend and fluctuation component time series, such as, for example, Trend_Y(t)=LowPassFilter[Y(t)], Fluctuation_Y(t)=HighPassFilter[Y(t)]. Additionally, provided an existing predictive model for the target brand, at least one embodiment of the invention includes denoting the predicted sales for time period t as X(t).

Another aspect of the invention includes selecting one or more features over different time scales for analysis. An example embodiment of the invention can include dividing a given total dataset into a training subset and a validation subset, wherein the training subset for feature selection. For each keyword-based predictor variable defined as described above, at least one embodiment of the invention includes computing the cross-correlation function between the trend component time series of the predicted target history and the predictor time series (for example, between Trend_Y(.) and Trend_KeyFreq(b, k, .)). Also, such an embodiment can additionally include computing the cross-correlation function between the fluctuation component time series of the predicted target history and the predictor time series (for example, between Fluctuation_Y(.) and Fluctuation_KeyFreq(b, k, .)). Further, for each sentiment-based predictor variable defined as detailed above, at least one embodiment of the invention includes computing the cross-correlation function between the fluctuation component time series of the predicted target history and the predictor time series (for example, between Fluctuation_Y(.) and Fluctuation_Senti (b, .)).

Based on the cross-correlation computations detailed herein, at least one embodiment of the invention includes selecting one or more predictor trend and fluctuation component time series, each of which being correlated (for example, correlated above a user-specified threshold) with the respective trend or fluctuation component of the predicted target history time series. At least one embodiment of the invention includes selecting all examined predictors having a cross-correlation value with either the trend or fluctuation component of a target variable that is greater than a user-defined threshold. Additionally, the selected keyword-based predictor variables can be denoted as $K_j(t)$ (j=1, 2, . . . , $N_K$), and the selected sentiment-based predictor variables can be denoted as $S_i(t)$ (i=1, 2, . . . , $N_S$).

Additionally, an aspect of the invention includes correcting an existing predictive model output via selected features from social media-based analysis such as described herein. An example embodiment of the invention includes training an autoregressive integrated moving average (ARIMA) as follows: ARIMA(p, d, q)*(P, D, Q) prediction model for the predicted target history Y(t), which can be carried out by combining the predicted outcomes from an existing predictive model X(t) with the selected keyword-based predictor variables $K_j(t)$ (j=1, 2, . . . , $N_K$) and sentiment-based predictor variables $S_i(t)$ (i=1, 2, . . . , $N_S$). Such an embodiment can include the following calculations: $\log(Y(t)=\alpha X(t)+\Sigma_j \beta_j K_j(t)+\Sigma_i \gamma_i S_i(t)+z_t$, and $z_t$=ARIMA(p,d,q)×(P, D, Q), wherein $\alpha$, $\beta_j$ (j=1, 2, . . . , $N_K$) and $\gamma_i$ (i=1, 2, . . . , $N_S$) are parameters inferred from learning. The dummy index j is used to indicate different keyword-based predictor variables, whereas the dummy index i is used to indicate different sentiment-based predictor variables. Also, $N_k$ and $N_s$ represent the total number of keyword-based predictors and sentiment-based predictors, respectively.

Also, in connection with the description above, a model can be built for each set of given ARIMA parameters such that p=non-seasonal AR order, d=non-seasonal differencing, q=non-seasonal MA order, P=seasonal AR order, D=seasonal differencing, and Q=seasonal MA order. By way of illustration, an example embodiment of the invention includes building an ARIMA model for each setting of (p, d, q, P, D, Q) and comparing models from different settings in terms of a criterion (as detailed further below) on a validation dataset. Subsequently, the best setting in terms of the criterion is identified and/or selected.

Additionally, at least one embodiment of the invention includes a model validation process to determine a best and/or most appropriate model for selection. An example embodiment of the invention can include validating models using a validation dataset. A model validation process can include applying each ARIMA model to the validation dataset and estimating the accuracy performance of each ARIMA model in terms of multiple criteria such as, for example, root mean squared error (RMSE) between predicted outcomes and actual historical outcomes, correlation between predicted target outcomes and actual historical outcomes, Akaike information criterion (AIC), Bayesian information criterion (BIC), etc. As noted above, this model application aspect can include applying an equation (such as detailed above) with known parameters (alpha, beta, gamma, etc.) estimated from an ARIMA model learning. Additionally, in terms of RMSE (for example), the best model (p, q, r, P, D, Q) setting that minimizes the RMSE is selected and used to predict one or more future outcomes.

Figure 2:
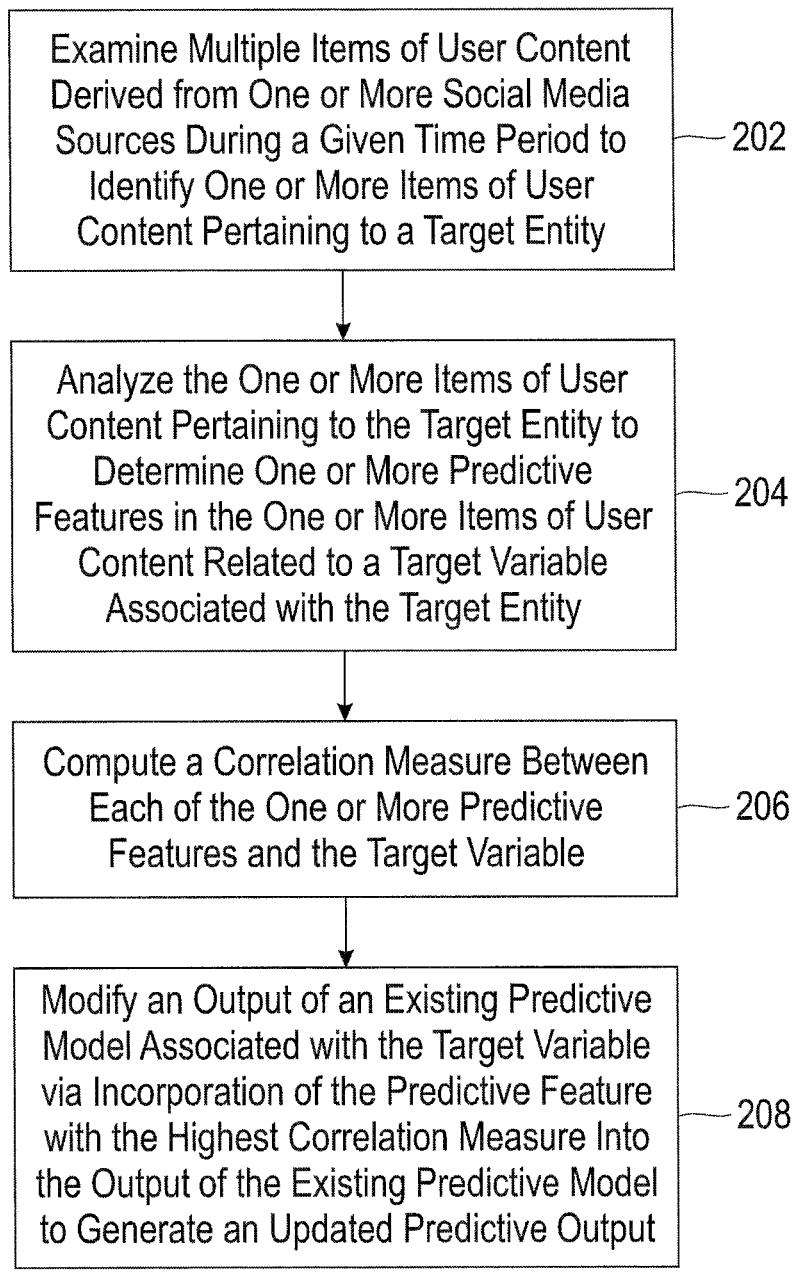
FIG. 2 is a flow diagram illustrating techniques according to an embodiment of the invention.

FIG. 2 is a flow diagram illustrating techniques according to an embodiment of the present invention. Step 202 includes examining multiple items of user content derived from one or more social media sources during a given time period to identify one or more items of user content pertaining to a target entity. The target entity can include, for example, a company associated with the existing predictive model or a competitor of the company associated with the existing predictive model.

As detailed herein, the examining step can include counting a total number of items of user content containing one or more given keywords during the given time period. Additionally, examining can include counting a total number of items of user content containing (i) a positive sentiment, (ii) a neutral sentiment, and/or (iii) a negative sentiment associated with the target entity during the given time period.

Step 204 includes analyzing the one or more items of user content pertaining to the target entity to determine one or more predictive features in the one or more items of user content related to a target variable associated with the target entity. The predictive features can include a keyword trend a keyword fluctuation, and/or a sentiment fluctuation.

Step 206 includes computing a correlation measure between each of the one or more predictive features and the target variable. Computing the correlation can include computing a cross-correlation function between a trend time series of a predictive feature and a trend time series of the target variable. Additionally, computing the correlation can include computing a cross-correlation function between a fluctuation time series of a predictive feature (for example, keyword fluctuation and/or sentiment fluctuation) and a fluctuation time series of the target variable.

Step 208 includes modifying an output of an existing predictive model associated with the target variable via incorporation of the predictive feature with the highest correlation measure into the output of the existing predictive model to generate an updated predictive output. Modifying can include modifying the output of the existing predictive model without utilizing specific information of the existing predictive model.

The techniques depicted in FIG. 2 can also include determining the given time period based on one or more parameters as well as generating one or more predictive outputs derived from the existing predictive model for the given time period. Additionally, at least one embodiment of the invention includes computing a sentiment measure associated with each of the items of user content containing a (i) positive, (ii) neutral, and/or (iii) negative sentiment associated with the target entity during the given time period. Further, the techniques depicted in FIG. 2 can include estimating a performance accuracy measure of the updated predictive model based on one or more metrics. Such metrics can include, for example, (i) a RMSE measure between a predicted outcome of the updated predictive model and a related historical outcome, (ii) a correlation between a predicted outcome of the updated predictive output and a related historical outcome, (iii) an AIC, and/or (iv) a BIC.

At least one embodiment of the invention can also include performing meta analysis to correct output from an existing predictive model, by combining the output from the existing predictive model with an analysis of selected features in social media data of potential customers, wherein the selected features are examined over different time scales. Additionally, in such an embodiment, the correction to the output from the existing predictive model is made without utilizing specifics of the existing predictive model, and the correction itself is modeled.

Further, at least one embodiment of the invention can also include identifying one or more items of user content pertaining to a target entity, wherein said one or more items of user content comprise user content derived from one or more pre-selected social media sources during a given time period, as well as analyzing the one or more items of user content pertaining to the target entity to determine (i) one or more keyword trends related to a target variable associated with the target entity, (ii) one or more sentiment fluctuations related to the target variable associated with the target entity, and (iii) one or more keyword fluctuations related to the target variable associated with the target entity. Such an embodiment also includes computing a correlation measure between the one or more keyword trends and a trend of the target variable, computing a correlation measure between the one or more sentiment fluctuations and a fluctuation of the target variable, and computing a correlation measure between the one or more keyword fluctuations and a fluctuation of the target variable. Additionally, such an embodiment further includes modifying an output of an existing predictive model associated with the target variable via incorporation, based on said correlation measures, of at least one of (i) the one or more keyword trends, (ii) the one or more sentiment fluctuations and (iii) the one or more keyword fluctuations into the output of the existing predictive model to generate an updated predictive output.

Also, such an embodiment can additionally include computing the correlation measures by computing a cross-correlation function between a trend time series of a keyword predictor and a trend time series of the target variable, computing a cross-correlation function between a fluctuation time series of a sentiment predictor and a fluctuation time series of the target variable, and/or computing a cross-correlation function between a fluctuation time series of a keyword predictor and a fluctuation time series of the target variable.

The techniques depicted in FIG. 2 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps.

Figure 3:
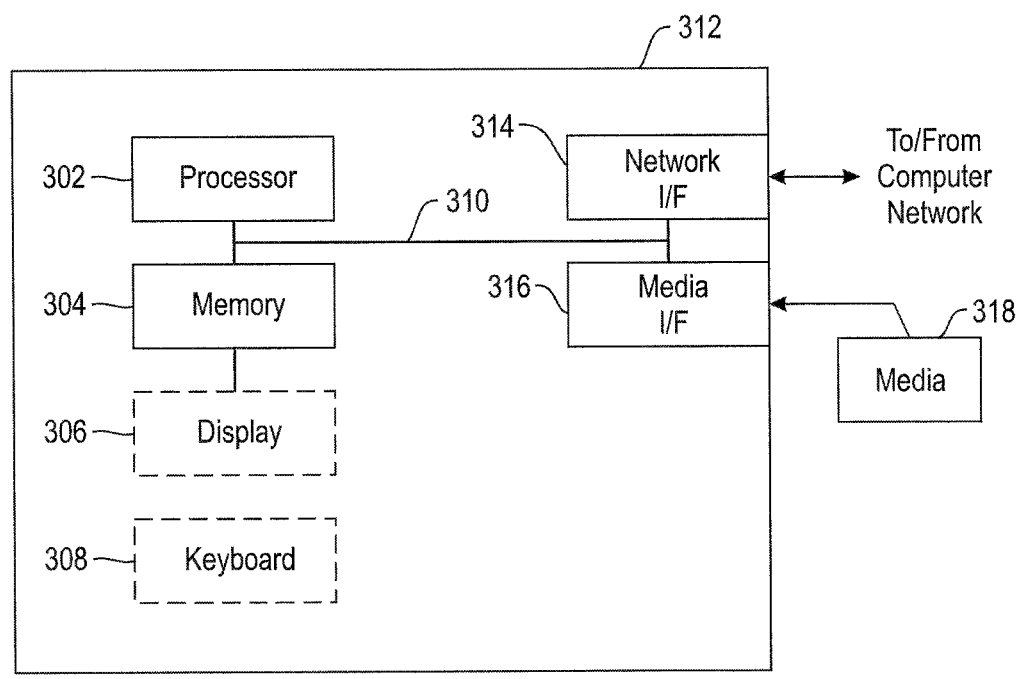
FIG. 3 is a system diagram of an exemplary computer system on which at least one embodiment of the invention can be implemented.

Additionally, an aspect of the present invention can make use of software running on a general purpose computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, as noted herein, aspects of the present invention may take the form of a computer program product that may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 302. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, combining an existing predictive model output with a social media-based analysis of selected features to correct or improve the existing predictive model output.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   examining multiple items of user content derived from one or more social media sources during a given time period to identify one or more items of user content pertaining to a target entity;
   analyzing the one or more items of user content pertaining to the target entity to determine predictive features in the one or more items of user content related to a target variable associated with the target entity, wherein the predictive features comprise (i) one or more keyword trends, (ii) one or more keyword fluctuations, and (iii) one or more sentiment fluctuations;
   computing, across multiple distinct time scales, a correlation measure between each of the predictive features and the target variable, wherein said computing comprises:
   (a) computing, for each of the multiple distinct time scales, a cross-correlation function between a keyword trend time series and a trend time series of the target variable;
   (b) computing, for each of the multiple distinct time scales, a cross-correlation function between a sentiment fluctuation time series and a fluctuation time series of the target variable; and
   (c) computing, for each of the multiple distinct time scales, a cross-correlation function between a keyword fluctuation time series and a fluctuation time series of the target variable;
   modifying an output of an existing predictive model associated with the target variable via incorporation of the predictive feature with the highest correlation measure into the output of the existing predictive model to generate an updated predictive output, wherein said modifying is carried out without utilizing any information contained within the existing predictive model; and
   estimating a performance accuracy measure of the updated predictive output based on a root mean squared error (RMSE) measure between a predicted outcome of the updated predictive output and a related historical outcome;
   wherein said examining, said analyzing, said computing, said modifying and said estimating are carried out by at least one computing device.

2. The method of claim 1, wherein the target entity comprises a company associated with the existing predictive model.

3. The method of claim 1, wherein the target entity comprises a competitor of a company associated with the existing predictive model.

4. The method of claim 1, wherein said examining comprises counting a total number of items of user content containing one or more given keywords during the given time period.

5. The method of claim 1, wherein said examining comprises counting a total number of items of user content containing (i) a positive sentiment, (ii) a neutral sentiment, and/or (iii) a negative sentiment associated with the target entity during the given time period.

6. The method of claim 5, comprising:
   computing a sentiment measure associated with each of the items of user content containing (i) a positive sentiment, (ii) a neutral sentiment, and/or (iii) a negative sentiment associated with the target entity during the given time period.

7. The method of claim 1, comprising:
   performing meta analysis to correct the output from the existing predictive model, by combining the output from the existing predictive model with an analysis of selected features in social media data of potential customers, wherein the selected features are examined over different time scales.

8. The method of claim 7, wherein the correction to the output from the existing predictive model is made without utilizing any information contained within the existing predictive model.

9. The method of claim 7, wherein the correction itself is modeled.

10. A computer program product, the computer program product comprising a computer readable storage medium having program instructions embodied therewith, the program instructions executable by a computing device to cause the computing device to:
    examine multiple items of user content derived from one or more social media sources during a given time period to identify one or more items of user content pertaining to a target entity;
    analyze the one or more items of user content pertaining to the target entity to determine predictive features in the one or more items of user content related to a target variable associated with the target entity, wherein the predictive features comprise (i) one or more keyword trends, (ii) one or more keyword fluctuations, and (iii) one or more sentiment fluctuations;
    compute, across multiple distinct time scales, a correlation measure between each of the predictive features and the target variable, wherein said computing comprises:
    (a) computing, for each of the multiple distinct time scales, a cross-correlation function between a keyword trend time series and a trend time series of the target variable;
    (b) computing, for each of the multiple distinct time scales, a cross-correlation function between a sentiment fluctuation time series and a fluctuation time series of the target variable; and
    (c) computing, for each of the multiple distinct time scales, a cross-correlation function between a keyword fluctuation time series and a fluctuation time series of the target variable;

modify an output of an existing predictive model associated with the target variable via incorporation of the predictive feature with the highest correlation measure into the output of the existing predictive model to generate an updated predictive output, wherein said modifying is carried out without utilizing any information contained within the existing predictive model; and estimate a performance accuracy measure of the updated predictive output based on a root mean squared error (RMSE) measure between a predicted outcome of the updated predictive output and a related historical outcome.

11. A method comprising:

identifying one or more items of user content pertaining to a target entity, wherein said one or more items of user content comprise user content derived from one or more pre-selected social media sources during a given time period, wherein said identifying comprises:
 (a) counting a total number of the items of user content containing one or more given keywords during the given time period;
 (b) counting a total number of the items of user content containing a positive sentiment associated with the target entity during the given time period;
 (c) counting a total number of the items of user content containing a neutral sentiment associated with the target entity during the given time period; and
 (d) counting a total number of the items of user content containing a negative sentiment associated with the target entity during the given time period;

analyzing the one or more items of user content pertaining to the target entity to determine (i) one or more keyword trends related to a target variable associated with the target entity, (ii) one or more sentiment fluctuations related to the target variable associated with the target entity, and (iii) one or more keyword fluctuations related to the target variable associated with the target entity;

computing, for each of multiple distinct time scales, a correlation measure between the one or more keyword trends and a trend of the target variable;

computing, for each of the multiple distinct time scales, a correlation measure between the one or more sentiment fluctuations and a fluctuation of the target variable;

computing, for each of the multiple distinct time scales, a correlation measure between the one or more keyword fluctuations and a fluctuation of the target variable;

modifying an output of an existing predictive model associated with the target variable via incorporation, based on said correlation measures, of at least one of (i) the one or more keyword trends, (ii) the one or more sentiment fluctuations and (iii) the one or more keyword fluctuations, into the output of the existing predictive model to generate an updated predictive output, wherein said modifying is carried out without utilizing any information contained within the existing predictive model; and estimating a performance accuracy measure of the updated predictive output based on a root mean squared error (RMSE) measure between a predicted outcome of the updated predictive output and a related historical outcome.

12. The method of claim 11, wherein said computing a correlation measure between the one or more keyword trends and a trend of the target variable comprises computing a cross-correlation function between a trend time series of a keyword predictor and a trend time series of the target variable.

13. The method of claim 11, wherein said computing a correlation measure between the one or more sentiment fluctuations and a fluctuation of the target variable comprises computing a cross-correlation function between a fluctuation time series of a sentiment predictor and a fluctuation time series of the target variable.

14. The method of claim 11, wherein said computing a correlation measure between the one or more keyword fluctuations and a fluctuation of the target variable comprises computing a cross-correlation function between a fluctuation time series of a keyword predictor and a fluctuation time series of the target variable.

* * * * *